(12) United States Patent
Crosswhite

(10) Patent No.: US 6,611,726 B1
(45) Date of Patent: Aug. 26, 2003

(54) METHOD FOR DETERMINING OPTIMAL TIME SERIES FORECASTING PARAMETERS

(76) Inventor: Carl E. Crosswhite, 1247 Clubhouse Dr., Broomfield, CO (US) 80020

(*) Notice: Subject to any disclaimer, the term of this patent is extended or adjusted under 35 U.S.C. 154(b) by 452 days.

(21) Appl. No.: 09/663,401

(22) Filed: Sep. 15, 2000

Related U.S. Application Data

(60) Provisional application No. 60/154,413, filed on Sep. 17, 1999.

(51) Int. Cl.$^7$ .............................................. G06F 19/00
(52) U.S. Cl. ........................... 700/99; 700/52; 700/100; 700/106; 705/8; 705/28
(58) Field of Search .............................. 700/52, 97, 99, 700/100, 106, 107; 702/180, 181; 705/28, 29, 8

(56) References Cited

U.S. PATENT DOCUMENTS

| | | | | |
|---|---|---|---|---|
| 5,299,115 A | * | 3/1994 | Fields et al. ................. | 364/401 |
| 5,608,621 A | | 3/1997 | Caveney et al. ............ | 395/216 |
| 5,712,985 A | * | 1/1998 | Lee et al. .................... | 395/207 |
| 5,819,232 A | * | 10/1998 | Shipman ........................ | 705/8 |
| 5,963,919 A | | 10/1999 | Brinkley et al. .............. | 705/28 |

* cited by examiner

*Primary Examiner*—Paul P. Gordon
(74) *Attorney, Agent, or Firm*—Kent A. Lembke; Hogan & Hartson LLP

(57) ABSTRACT

A method for forecasting a value of a dependent variable, such as product demand, in a future time period later than the next, upcoming future time period. The method includes selecting a dependent variable for which a value is to be forecast, gathering historical data on values of the dependent variable and explanatory variables in prior time periods, and determining a forecasting equation based on the gathered historical data. The method includes selecting a future time period that is a number of time periods beyond the next, upcoming time period. The forecasting method continues with calculating a forecasted value of the dependent variable for the selected future time period, then determining an error value by comparing the forecasted value with the historical data and based on the error value, modifying the forecasting equation to reduce the error value. The forecasting equation may be a time series forecasting equation and the determining of the forecasting equation includes initial setting values for included time series forecasting parameters. The modifying of forecast equation then includes adjusting these forecasting parameters to lower or otherwise optimize the error value. Particularly, the method includes selecting an error metric for optimization for the forecasting equation and the adjusting of the parameters is performed as a function of the selected error metric to move it toward an optimal value.

16 Claims, 3 Drawing Sheets

METHOD FOR DETERMINING OPTIMAL TIME SERIES FORECASTING PARAMETERS

CROSS REFERENCE TO RELATED APPLICATIONS

Figure 1A:
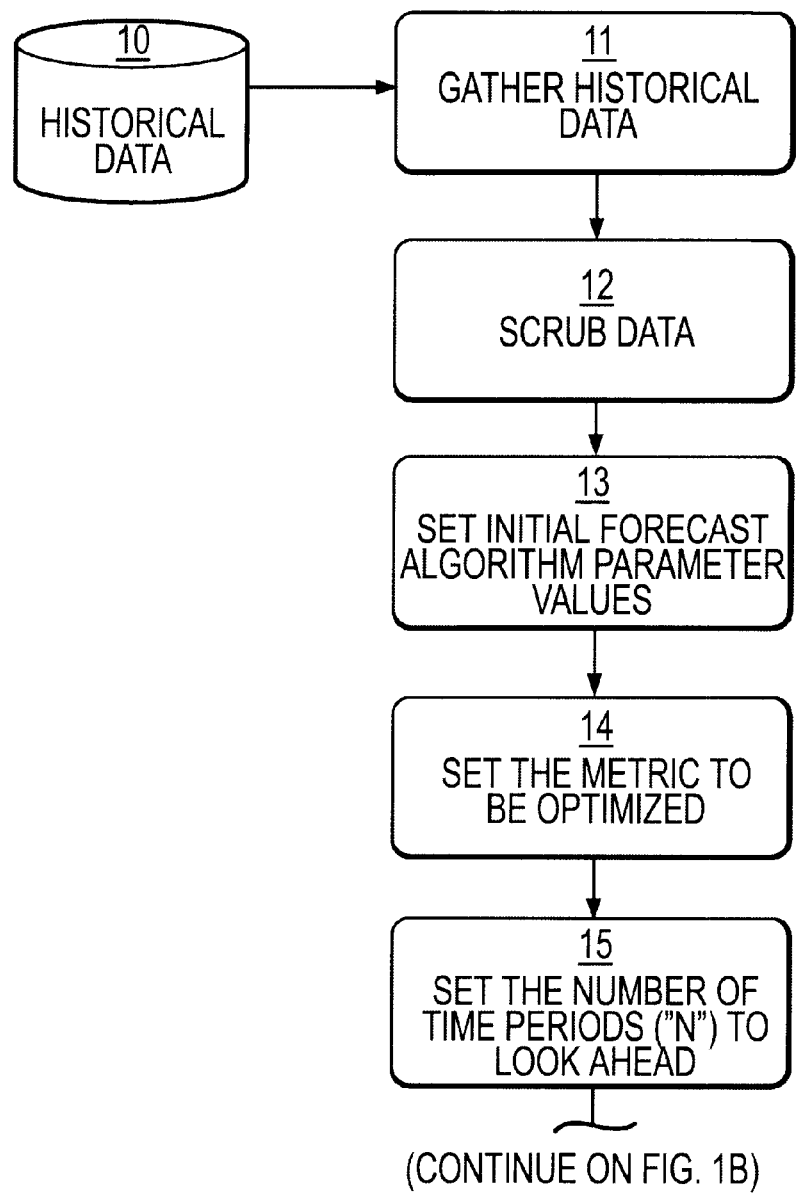

This application claims priority from U.S. Provisional Patent Application No. 60/154,413 filed on Sep. 17, 1999. The entire disclosure of the provisional application is considered to be part of the disclosure of the accompanying application and is hereby incorporated by reference.

FIELD OF THE INVENTION

The present invention relates to a new method for calculating time series forecasting parameters that includes looking forward to improve forecasting accuracy for supply chain needs beyond the next time period. In particular, the invention is directed to a method for estimating the parameters of a selected forecasting method such that the forecast is not necessarily most accurate in the next, upcoming time period but is instead optimized to give a more accurate forecast for some specific, user-selected future time period. The method is also applicable to estimate time series forecasting parameters when it is necessary to optimize a time series forecast for two or more future time intervals combined.

BACKGROUND OF THE INVENTION

Organizations need to carefully plan and be prepared for their future business in order to be successful, and the required planning includes understanding supply chain complexities and predicting future behaviors and values of planning variables, such as product demand. For example, organizations must plan to have sufficient product available to meet demand while not having excess product that may quickly become "stale" or out dated. Outdated inventory is a serious and potentially costly problem for companies that manufacture and sell high technology and other products with shorter life spans.

One measure of organizational success used by organizations for planning purposes is revenue. Consequently, as a part of planning, organizations need to accurately estimate future income as well as carefully plan future expenses in order to calculate expected revenues. One method used to calculate expected revenues is to estimate future income from historical demand or sales information and then budget expenses from the estimate of future income. However, this method does not address the complexities of supply chains and the impact supplier characteristics can have on providing components that are later utilized to manufacture products to meet forecasted demand.

Another method to calculate expected revenues is to estimate both future income and future expenses from historical information and then evaluate the reasonableness of the estimated expenses to determine if the forecasted expenses need adjusting. Both of these approaches allow an organization to determine a relationship between income, expenses, and revenues, and of course, there are numerous other methods that are utilized by organizations for strategic planning.

Estimating income and other planning variables from past or historical information is always necessary regardless of which of the planning approaches is selected. Typically, some form of forecasting process uses the historical information to provide these estimations. As a specific example, organizations estimate future income by forecasting the future demand for each individual product. This approach is used since each product is likely to produce a different income per unit.

In addition to providing information about estimated income for the planning group of the organization, the forecasted demand provides information that is relatively consistent across the organization for other groups within the organization to use. For example, if the organization manufactures a product, the forecasted demand for each product is often used to determine the effect on the organization's ability to manufacture sufficient products. The manufacturing group needs to determine if their manufacturing capabilities are adequate and if they have sufficient inventories of component parts to produce the potential product demand. Without adequate manufacturing capability or sufficient inventory, the organization may not be able to manufacture enough products to produce planned incomes. This would reduce income and adversely affect expected revenues.

The manufacturing group also relies on forecasted demand to allocate its resources efficiently, balance workload against the forecasted demand, and plan their operations to meet the needs the product demand places on them. Without this manufacturing planning, manufacturing may not be able to produce products in a timely manner, which would limit the availability of the product for the customer when the customer wants to purchase the product. This would also decrease sales and reduce income and adversely affect expected revenues.

Manufacturing organizations occasionally use just-in-time manufacturing. This manufacturing approach minimizes excess inventory by providing the component parts to assemble a product just in time for the assembly process. This reduces or even eliminates any component part inventory, which minimizes the risk of manufacturing components becoming outdated. However, even organizations that use the just-in-time approach must accurately determine how many and when each component will be needed. Such a determination again involves forecasting or predicting future demand and/or need that will exist in the next time period and, more likely, in the next several time periods to allow components to be ordered and delivered by a supplier.

A lead time problem often occurs when ordering component parts. Some suppliers can provide component parts with little or no notice, i.e., no or little lead time. Other component part suppliers may require the manufacturer to place orders for components several months in advance, even as much as six months in advance. The reasons behind this requirement may range from the length of time needed to make the component part to transportation delays for shipping the parts from manufacturing sites abroad and to a simple need to be able to plan their own future manufacturing effort. The varying lead-time problem is made even more significant if these long lead-time components are also very expensive.

For example, the manufacturer of some expensive components, such as computer components, may require orders be placed three months in advance and these orders may also be non-cancelable. Consequently, accurately forecasting how many of these components a company will need in three months or a time period coinciding with a supplier's required lead time, is a very important part of effective organization planning, such as inventory management. Further in this regard, manufacturing organizations do not want to inaccurately order expensive components because having too few components will result in lost income from the product but having too many components will result in unnecessary expenses. Also, sometimes these expensive components have a short lifetime of usefulness and having excess inventory of outdated components may lead to wasted expense if these components need to be discarded.

Clearly, accurate forecasting is important to the success of a business or other organization, but a perfectly accurate forecast is not possible, even with existing forecasting software products and computer-implemented computation methods. Generally, the process of forecasting product demand includes accessing historical product demand data, analyzing the data to determine if they are suitable to use for forecasting, and then processing the historical demand data to produce demand forecasts for the future.

Existing forecasting typically begins with accessing historical product demand data. Organizations store their historical data in a variety of data sources. The data necessary for forecasting may be stored in spreadsheets, databases, data marts, or data warehouses. This data may be retrieved using OLAP (on-line analytical processing) engines, MOLAP (multiple OLAP) engines, ROLAP (relational OLAP) engines, Open Data Base Connectivity (ODBC), Java's JDBC data connectivity and other methods that allow for data mining and analysis. Once historical demand data has been retrieved, data analysis determines if there exists data anomalies such as outliers, missing data, and the like that require adjustments to the historical data to smooth or remove these anomalies. Various smoothing methods in use today include setting missing data to zero, averaging neighboring data to correct for outliers or missing data, using time series forecasting with the preceding data to estimate the value of the outlier or missing data, or using a spline fitting method to interpolate for a value of the outlier or missing data After the historical demand data has been retrieved, and possibly adjusted, then this historical data is used with a variety of forecasting methods to estimate future product demand.

There are a number of forecasting methods available today (Makridakis, 1998) that allow organizations to predict future product demand from historical demand data. Although this discussion focuses on product demand, these forecasting methods can be applied to any form of business data. These forecasting methods are often referred to as "time series forecasting" because the historical data used has been collected over time and is typically collected at evenly spaced intervals, such as hourly, daily, monthly, quarterly, and the like. Time series methods include single and double moving average methods, single exponential smoothing methods, Brown's and Holt's double exponential smoothing methods, Brown's and Holt-Winter's seasonal forecasting methods, Autoregressive Integrated Moving Average (ARIMA) methods, Box-Jenkins methods, Multivariate ARIMA (MARIMA), and neural network methods. Additionally, other mathematical methods are used to forecast future product demand. Multiple linear regression (Draper & Smith, 1981) is used to forecast information about a dependent variable, such as future demand, from information known about related independent variables. This method goes beyond the simple time series forecasting by including additional information from related independent variables and their forecasts. Variations of multiple linear regressions are also used in forecasting future information. These methods include Autoregressive regression, dynamic regression, stepwise regression, principal component regression, canonical correlation analysis and iterative regression.

Organizations typically apply some, or all, of these forecasting methods to individual historical data for each product. If the individual data are a part of a product grouping, then further forecasting is applied to the product group as well as the individual products. Forecasting grouped data produces a single point estimate for the forecast for various individual products and for the groups of products.

While forecasting is an important part of the planning process, existing forecasting approaches, and particularly, time series forecasting approaches, create a forecast that is most accurate for the next time period beyond the data being used in the calculation (i.e., known or historical data). For example, if the time or planning period used is months, then the forecast is most accurate for the upcoming month based on historical data collected for past months. Unfortunately, time series and other forecasting methods are less accurate for each subsequent time period in the future after the first future time period. This inaccuracy in future time periods has a significant impact on the planning process. For example, a manufacturer's supply chain may be managed inefficiently when parts, involved in the manufacture of a product, need to be purchased in advance of the next time period because the forecast is inaccurate for the period used for planning purposes. Because the forecast is optimal for the next time period but planning decisions being made for time periods beyond the upcoming time period, the existing methods of forecasting fail to provide the accurate and useful information.

Consequently, there remains a need for methods of improving the accuracy of forecasting methods for time periods after the next, upcoming time period. Preferably, such forecasting methods would be adapted for using historical data similar to that currently collected by organizations, for using any or all of the existing methods of accessing such data, and for using existing methods of adjusting data anomalies. Additionally, it is preferable that such forecasting methods would be relatively simple and inexpensive to implement.

SUMMARY OF THE INVENTION

An object of the present invention is to permit better decisions for the scheduling of manufacturing processes and the planning of resources further into the future.

It is another object of the invention to enhance decision-making regarding the procurement of component parts for the manufacturing process, especially when a lead-time is imposed on the ordering of these components, to enable organizations to be more successful.

A more specific object of the invention is to produce a time series forecast analysis that is easy to explain and interpret and provides the understanding that the "best" forecast possible is aligned with a selectable future time period, or time periods, beyond merely the next, upcoming time period.

These and other objects are met in accordance with the present invention by providing an improved method in which a forecasting error is calculated and then a set of parameters that produced that forecast are optimized thereby, minimizing the error for one or more future time periods. The forecasting method of the present invention is a robust system that can handle any form of statistical forecast. For example, time series forecasting may be employed and involves using historical information, combined with algorithmic methods, to create estimates for what the values of the previously measured variables, such as demand, will be in the future.

In accordance with a preferred embodiment of the present invention, a method is provided for generating a forecast that is optimal for a user-selectable, future time period or time periods. The method differs from existing forecasting methods because it disregards the accuracy of the near term forecast (i.e., the next, upcoming time period) and works with a forecast that is as optimal as possible for the time period in which a user of the method must make a decision. Further, if decisions need to be made that involve more than one future time period, the method may include the step of optimizing a weighted average of the forecasting accuracy for each selected period. In one embodiment, the weighting step is performed according to relative cost or loss that would occur for each unit of a forecasted component if the forecast for that component were inaccurate.

Because the present invention improves on the accuracy of time series forecasting, it may be useful to provide a brief discussion of this type of forecasting. Time series forecasting uses parameters to determine their mathematical form. Individuals using time series forecasting may specify these parameters or these parameters can be "optimized" for a metric associated with the time series method. In this regard, metrics may be any one of several statistics or likelihood estimates associated with the time series forecasting method. Optimization is typically chosen to minimize the statistic or to maximize the likelihood estimate (i.e., minimize or maximize a given metric). The method of the invention is configured to work with all metrics typically associated with time series forecasting methods.

Obtaining time series metrics involves calculating the error between the mathematical form of the time series (i.e., the forecast equation) and the actual (i.e., historical) data throughout the historical periods. Significantly, the determination or calculation of all metrics used in time series forecasting requires use of the error term. For example, the metric calculation may use the absolute value of the error, the square of the error, likelihood estimates of the error, or any number of other transformations of the error. Generally, metrics have been determined based on errors that are calculated as the difference between the estimated forecast for the present period and the actual (historical) value for the same period.

The method of the present invention involves optimizing the parameters of the forecast form using the above expression of the metrics to thereby optimize the forecasting results. The method provides a change in the prior method in which the error was calculated by finding the difference between the estimated forecast (n) periods into the future (rather than simply the next time period) and the actual value for that future period. A significant problem that this invention addresses is for those situations where the optimal forecast for a period in the future is preferred over the optimal forecast for the present period. For example, if it is preferred that the forecast for two periods in the future (e.g., two months in the future if the actual data is recorded on a monthly basis) be optimal instead of the present period, the method of the present invention determines optimal parameters for forecasts two periods into the future. In another preferred embodiment, the method optimizes the average forecast over a number of periods in the future (e.g., optimizes the average of the Forward Looking Forecast, looking forward one, two and three periods). Although a simple average can be utilized, a weighted average over several periods is preferably used to indicate a different importance of the forecast for different periods, e.g., most (e.g., 70%) importance or weight would be two periods ahead, and the remaining (e.g., 30%) importance would be equally divided between one and three periods ahead.

According to one aspect of the invention, a method is provided for forecasting a value of a dependent variable, such as product demand, in a future time period later than the next, upcoming future time period. The method generally includes selecting a dependent variable for which a value is to be forecast, gathering historical data on values of the dependent variable and explanatory variables in prior time periods, and determining a forecasting equation based on the gathered historical data. Significantly, the method further includes the step, which may be completed by a user, of selecting a future time period that is a number of time periods beyond the next, upcoming time period. Once a future time period is selected, the forecasting method continues with calculating a forecasted value of the dependent variable for the selected future time period, then determining an error value by comparing the forecasted value with the historical data and based on the error value, modifying the forecasting equation to reduce the error value. In a preferred embodiment, the forecasting equation is a time series forecasting equation and the determining of the forecasting equation includes initial setting values for included time series forecasting parameters. The modifying of forecast equation then includes adjusting these forecasting parameters to lower or otherwise optimize the error value. In another preferred embodiment, the method includes selecting an error metric for optimization for the forecasting equation and the adjusting of the parameters is performed as a function of the selected error metric to move it toward an optimal value. The error metric may be selected from myriad error metrics but is typically selected from the error metrics including mean absolute deviation (MAD), mean absolute error (MAE), mean absolute percentage error (MAPE), and root mean squared error (RMSE). The forecasting may optionally further include prior to the calculating, cleansing the gathered historical data by identifying and replacing missing data and identifying and modifying outliers.

Other features and advantages of the invention will be seen as the following description of particular embodiments progresses, in conjunction with the drawings.

BRIEF DESCRIPTIONS OF THE DRAWINGS

Figure 1B:
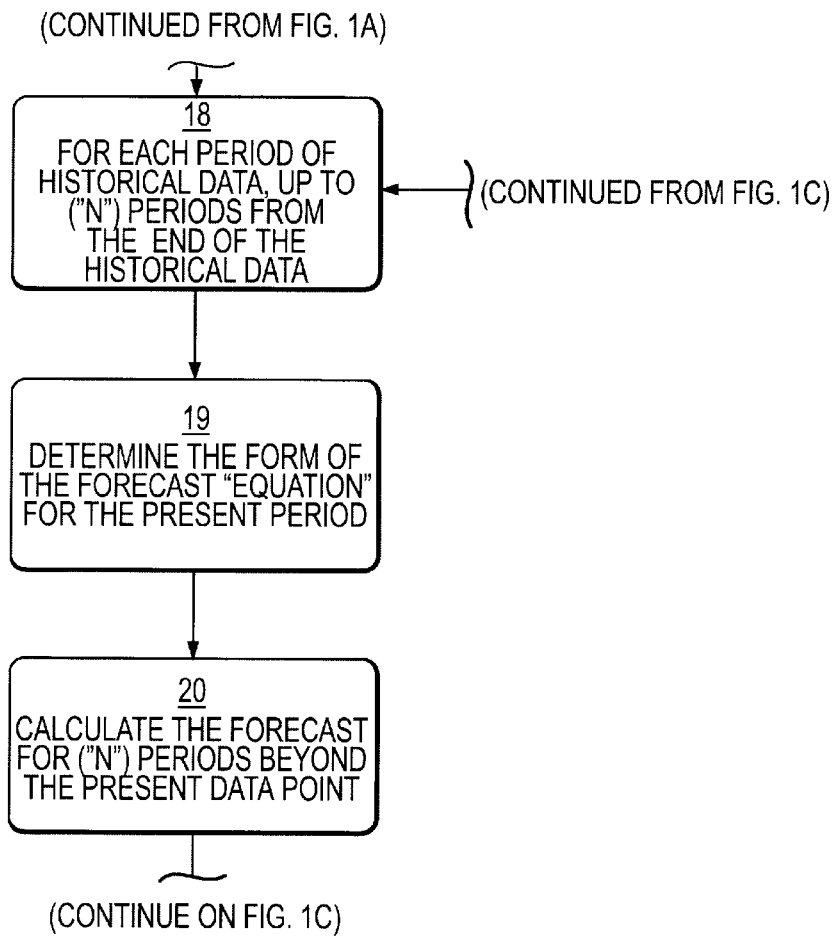
Figure 1C:
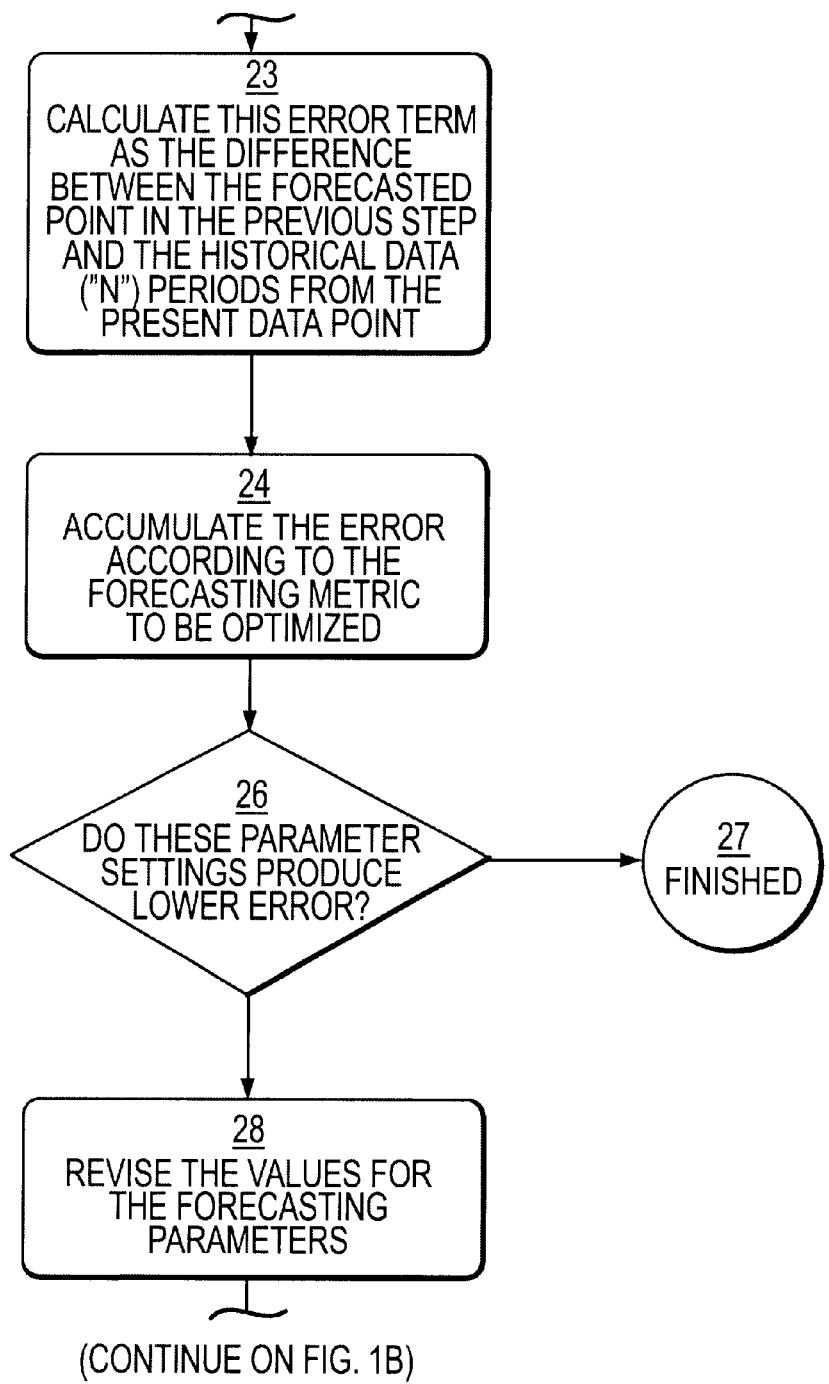

The foregoing and other objects, aspects and advantages of the invention will be better understood from the following detailed description with reference to the drawings, in which:

FIGS. 1A–1C are a flowchart of a forecasting method according to the present invention.

DETAILED DESCRIPTION OF THE PREFERRED EMBODIMENTS

The following definitions are deemed useful in understanding the present invention:

"Autocorrelation" describes a relationship or correlation between values of the same data series at different time periods.

"Autoregression" describes a relationship similar to autocorrelation, except instead of the variable being related to other independent variables, it is related to previous values of its own data series.

"Brown's seasonal smoothing" is a seasonal forecasting method in which all of the forecasting parameters are the same.

"Double exponential smoothing" applies single exponential smoothing twice—once to the original data and then to the resulting single exponential smoothing data.

It is useful where the historic data series is not stationary. This method of forecasting is sometimes known as Brown's exponential smoothing.

"Double moving average" smooths out past data by performing a moving average on a subset of data that represents a moving average of an original set of data.

"Forecast" is the prediction of values of a variable based on known past values of that variable or other related variables.

"Forward stepwise" is a regression method that adds one independent variable at a time to a multiple linear regression equation starting with the independent variable with the greatest significance.

"Holt-Winters' additive seasonal smoothing" separates a series into its component parts: seasonality, trend and cycle, and error. This method determines the value of each, projects them forward, and then reassembles them to create a forecast.

"Holt's double exponential smoothing" is similar to double exponential smoothing, but this method uses a different smoothing constant for the second smoothing process.

"Holt-Winters' multiplicative seasonal smoothing" considers the effects of seasonality to be multiplicative or, in other words, to be growing (or decreasing) over time. This method is similar to the Holt-Winters' additive seasonal smoothing method.

"Independent variables" in multiple linear regression are the data series or variables that influence a dependent data series or variable.

"Iterative stepwise regression" is a regression method that adds or subtracts one independent variable at a time to or from the multiple linear regression equation.

"Linear regression" is a process that models a variable as a function of other first-order explanatory or independent variables. It approximates an equation's graphed results with a line, not a curve, which would require higher-order terms involving squares and cubes.

"MAD" or mean absolute deviation is an error statistic that averages the absolute distance between each pair of actual and fitted data points to keep the positive and negative errors from canceling each other out.

"MAE" or mean absolute error is another term for the mean absolute deviation (MAD).

"MAPE" or mean absolute percentage error is a relative error measure that uses absolute values to keep the positive and negative errors from canceling each other out and uses relative errors to let you compare forecast accuracy between time-series models.

"Multiple linear regression" is a case of linear regression where one dependent variable is described as a linear function of more than one independent variable.

"Naive forecast" is a forecast obtained with minimal effort based only on the most recent data, e.g., using the last data point(s) to forecast the next period.

"Outliers" are data that are outside three standard deviations of the population mean.

"Regression" is a process that models a dependent variable as a function of other explanatory (i.e., independent) variables.

"RMSE" or root mean squared error is an absolute error measure that squares the deviations to keep the positive and negative deviations from canceling each other out. This measure also tends to exaggerate large errors, which is sometimes preferred to provide focus on very large errors.

"Seasonality" is the change that seasonal factors cause in a data series. For example, if sales increase during the Christmas season every year, the data is seasonal with a one-year period.

"Single moving average" smooths out past data by averaging the last several periods and projecting that view forward.

"Smoothing" estimates a smooth trend by removing extreme data and reducing data randomness.

"Standard deviation" is the square root of the variance for a distribution and provides a measurement of the variability of a distribution, i.e., the dispersion of values around the mean.

"Time series" is a set of values that are ordered in equally spaced intervals of time.

"Trend" is a long-term increase or decrease in time-series data.

"Variance" is the square of the standard deviation, i.e., the average of the squares of the deviations of a number of observations from their mean value. Variance can also be defined as a squared measure of the dispersion, or spread, of a set of values about a mean. When values are close to the mean, the variance is small. When values are widely scattered about the mean, the variance is large.

The present invention is a forecasting system and method for calculating time series forecasting parameters involving looking forward to improve forecasting accuracy for supply chain needs beyond the next, immediate time period. The system (not shown) typically will comprise a computer system with processing devices, input and output devices, and memory and may include nearly any electronic devices configured to perform the functions required by the method. Additionally, the method of the invention may be implemented using the Internet and other communication networks with the method being performed at a server device connected to such network.

FIGS. 1A–1C show the overall steps of the forecasting method that generally includes: accessing existing (historical) data (10), cleansing the data if necessary (12), generating the forecast from an initial set of forecasting parameters (20), assessing the error by projecting the forecast into the future and comparing the forecasted value with the historical information at one or more future points (23), accumulate the total error for all historical data points possible using the current set of forecasting parameters (24), and making a determination if these parameters result in a minimum accumulated error and if not, adjusting the parameters (26) and (28) and repeating the process by returning to (18). If the parameter adjustment results in a larger error than before, then the next parameter adjustment is made opposite to the previous adjustment.

Accessing existing historical data (10), such as prior product demand, is a requisite part of the forecasting method. Accessing existing data (10) is followed by or could be thought of as including gathering or retrieving data (11), which includes determining the data format and location. Organizations store their historical data in a variety of data sources. Consequently, the data necessary for forecasting may be stored in spreadsheets, databases, data marts, or data warehouses. So, gathering the data (11) may involve, for example, retrieving the data from numerous and varied storage locations and devices, such as on an Excel spreadsheet, an Access Database or other SQL database, and the like. Further, the data may be accessed through other software systems and mechanisms such as on-line analytical processing (OLAP) engines, multiple OLAP (MOLAP) engines, relational OLAP (ROLAP) engines, Open Data Base Connectivity (ODBC), and/or Java's JDBC data connectivity along with other methods that allow for data mining and analysis. After the data format and location, step (11) continues with connection to the source of the data. The source of the data may be as simple as data stored on a floppy disk or may be manually entered. Alternatively, gathering the data (11) may involve use of a more extensive access mechanism that connects to and uses a local area network (LAN) or a worldwide access through the use of a communication protocol such as TCP/IP or HTTP over TCP/IP. Once the data has been located and the connection to the data source has been made, a copy of the data is retrieved as part of step (11) to use in subsequent steps.

Once a copy of the historical data has been retrieved, the method continues by evaluating whether a portion of the data is not representative of normal data. Specifically, data analysis determines if there are data anomalies such as outliers, missing data, and the like that require adjustments to the historical data to smooth or remove these anomalies. In general, various smoothing methods may be used as part of the invention, including setting missing data to zero, averaging neighboring data to correct for outliers or missing data, using time series forecasting with the preceding data to estimate the value of the outlier or missing data, or using a spline fitting method to interpolate for a value of the outlier or missing data. The present invention can utilize any or all of these methods of adjusting data anomalies. As a further illustration, non-representative data may occur because, at some point, an abnormal event occurred which resulted in missing data or data that was not within the normal pattern. Missing data can occur if the information for that period was not collected or not permanently recorded. Other non-representative situations that might occur include an extremely large order for a product that would not occur under normal circumstances. This would create data that was outside the norm, typically called an outlier.

In this regard, the forecasting method may include a scrubbing or cleansing data step (12). Scrubbing data (12) is not a requisite step. This step, if necessary, should be able to be recreated for future forecasting steps to provide a consistency of forecasting results from one forecasting period to another. The first step of scrubbing data (12) is a determination if any data scrubbing is necessary. If there is missing data, then the missing data values must be filled in as part of the scrubbing data step (12). Methods to fill in missing data may comprise filling in a value of zero if the reason for the missing data were merely a business situation where there were no products sold during that period. A second method to fill in missing data may comprise using a forecasting approach such as outlined below for step (20) (e.g., for "n"=1) to forecast all of the data prior to the period that data were missing and then projecting a point estimate forecast to the next period to use as the replacement value for the missing data value. A third method to fill in missing data may comprise averaging the data values on either side of the missing data and using the average as the replacement for the missing data value. A fourth alternate method to fill in missing data may include fitting a curve through all of the existing data and then interpolating inside of the curve to determine the replacement for the missing data value.

After filling in missing data, a further check should be conducted as part of step (12) to determine if there are any data outside the normal range of historical data values, which are called outliers. To modify abnormal data values, several approaches can be used as part of the forecasting method of the invention. One approach involves determining if the abnormality was caused by an identifiable business situation such as a singular large sale. If this is the situation, then the data could be scrubbed at (12) by subtracting the singular large sale. A second alternative approach includes ignoring the abnormal data value, fitting a curve through all of the existing data, and then interpolating inside of the curve to determine the replacement for the outlier. Another approach comprises ignoring the abnormal data value, averaging the data on either side of the outlier, and using the average as the replacement for the outlier.

Once the data has been retrieved (11) and possibly scrubbed (cleaned) (12), the forecasting method continues generally with the substeps necessary to produce a forecast (e.g., what will future product demand be?) from the retrieved and scrubbed historical data. In this regard, there are a number of forecasting methods available (which are incorporated herein by reference) that allow organizations to predict future product demand from historical demand data. There are a large number of methods to create forecasts from historical data and any of these methods can be used in the method of the present invention. The exact algorithms for these methods can be found, for example, in [Forecasting Principles & Applications by Stephen A. DeLurgio; Copyright 1997; McGraw Hill College Div], [Forecasting and Time Series Analysis by Douglas C. Montgomery and Lynwood A. Johnson; Copyright 1976; McGraw Hill Book Company], [Forecasting & Time Series by Bruce L. Bowerman and Richard T. O'Connell; Copyright 1979; Duxbury Press], [Forecasting using a neural network and a statistical forecast, U.S. Pat. No. 5,461,699 Arbabi, et al. Oct. 24, 1995], [Forecasting: Methods and Applications by Spyros G. Makridakis, Steven C. Wheelwright, and Rob J. Hyndman; 3rd edition; Copyright 1998; John Wiley & Sons], and [Applied Regression Analysis by Norman R. Draper and Harry Smith; $2^{nd}$ Edition; Copyright 1981; John Wiley & Sons], each of which is incorporated herein in its entirety by this reference. With the progress in computing power, this invention focuses on using and improving each of the methods available. Each method can be used to compute the values that would have been forecasted for the historical data periods. These forecasted historical values are called the "fit" in the sense that they show how closely the forecasting method fits the historical data.

Prior to calculating the forecast (regardless of which forecasting procedure is utilized), the forecasting method of the present invention includes several unique substeps. First, at (13), the method includes setting initial forecast algorithm parameter values based on the scrubbed historical data. These initial settings can be randomly generated numbers, can be set to the middle of the parameter range of values, or more preferably, can be best guess-type estimates from prior forecasting of similar independent variables and processes. At (14), an error metric is selected for optimization. Next at (15), the number of time periods (n) to look ahead during the forecast is selected. This number provides the time period for which the forecast will be made most accurate (for example, the third time period may be selected, i.e., the third month from the present month or the third hour from the present hour). At (18), a subset of the historical data from the beginning of the series is selected for use as the basis of the forecasting equation. Starting with a sufficient amount of data, a forecast using this subset of the data is created. Next at (19), the form of the forecast equation is determined from the subset of historical data and based on the forecasting methodology selected for use, further using the gathered and scrubbed historical data. The forecasting method of the invention continues at (20) with the calculation of the forecast for the n-th period beyond the present period using the initialized parameters. This forecast determination involves extrapolating the forecast the selected number of periods into the future using the equation of step (19).

The next step (23) in the forecasting method is to determine the amount of error resulting from the forecasting equation with the initialized parameters. The error for any single period is the difference between the fit (i.e., estimated forecast) and the historical value for that period. In prior art forecasting methods, error calculations in time series forecasting used the actual (historical) data and the estimated forecast (fit) for the same data for each time period. The individual error term was the value (Forecast$_i$–Actual$_i$) for time period "i." Occasionally, the absolute value of this error term was used instead when only the magnitude of the error is considered important. This error term was used in the calculation of various summary statistics for time series forecasting such as Mean Absolute Deviation (MAD, also known as the Mean Absolute Error, MAE), Mean Absolute Percent Error (MAPE), Root Mean Squared Error (RMSE) along with likelihood estimation. Optimization of forecasting parameters used in exponential smoothing methods, autoregressive methods and neural network models attempts to minimize the error statistic (MAD, MAE, MAPE, RMSE, etc.) or maximize likelihood estimates such that the estimated forecast (fit) for period "i" is the closest to the actual (historical) data for period "i." This produces forecasting parameters that are optimal for the present period and forecasts for future periods are sub-optimal. Unfortunately, organizations that use time series forecasting frequently do not need to optimize the forecasting parameters for the present period. Instead, they need a forecast that is the most accurate for a given number of time periods in the future (e.g., two). In this example, decisions are made from the forecast for two time periods ahead and accuracy in the first or next time period may not be helpful.

In contrast, the present invention produces forecasting parameters that minimizes the error statistic (MAD, MAE, MAPE, RMSE, etc.) or maximizes likelihood estimates such that the estimated forecast (fit) for the preferred (future) period is the closest to the actual (historical) data for the preferred (future) period. This produces forecasting parameters in which forecasting the preferred future period is optimal and forecasts for others periods are likely to be sub-optimal. Since positive and negative errors would cancel themselves, the error calculation preferably utilizes the absolute value of these errors or the squared value of these errors. These absolute (or squared) error values are used to determine a single numerical error metric. The error metric may be MAD, MAE, MAPE or RMSE. It is also common that no one forecasting method would be the "best" (having the smallest numerical value for the error metric) in all error metric categories at the same time. It is more common that an individual industry would select one error metric and then all of the forecasting methods can be ranked on the numerical value of this one error metric. With the selected error metric, all forecasting methods can be ranked and their relative accuracy can be used as a gauge to determine which forecasting method works the best for the historical data. This allows better selection of the preferred forecasting methodology to be used (although any methodology may be utilized as part of the invention).

With the selected forecast method and the computed "fit" computed for each of the historical time periods, the individual error terms (residuals) can be computed as part of (23). As long as there actual (historical) data exists for the future, forecasted period, determine the error as the difference between the extrapolated forecast and the actual data for the future period. The expression for the individual error term is the value (Forecast$_{i+n}$–Actual$_{i+n}$) which is the difference between the forecast from actual (historical) data through time period "i", forecasting "n" periods ahead to time period "i+n" and the actual or historical data at time period "i+n."

The forecasting method of the invention continues at (24) with the accumulation of the individual error terms. Specifically, the error terms for the metric that has been selected to be optimized are accumulated, and this is used to determine an error statistic or likelihood estimate. At (26), the error statistic from step (24) is used to determine whether the present parameter settings are producing the lowest error (e.g., is the forecast more accurate for the selected period). The method of the invention is an iterative process, and if the error is not the lowest with the present parameters, the forecasting method continues to step (28) in which the values of the forecasting parameters are adjusted to improve the forecast and the method repeats steps (18) through (26). If at (26), the error is determined to be the lowest (i.e., minimized), and therefore the forecast for the n-th period more accurate, then the forecasting method ends at (27).

In general, the forecasting method of the present invention provides a solution to this problem of producing higher accuracy forecasts in a selectable period in the future can be outlined by: perform the following steps until the chosen error statistic is minimized or likelihood estimate is maximized.

a. Select a time series forecasting method.
b. Select values for the parameters of the time series forecasting method.
c. Select an error measure as the metric to evaluate the "best" solution.
d. For each time period of actual (historical) data:
   i. Determine the forecasting equation from the actual (historical) data to this point.
   ii. Using the forecasting equation, extrapolate the forecast the desired number of periods into the future.
   iii. As long as actual (historical) data exists for "n" periods beyond the current point, determine the error as the difference between the extrapolated forecast and the actual data for the future period.
   The expression for the individual error term is the value (Forecast$_{i+n}$–Actual$_{i+n}$) which is the difference between the Forecast from actual (historical) data through time period "i", forecasting "n" periods ahead to time period "i+n" and the Actual (historical) data at time period "i+n."
   iv. Accumulate the error and repeat this procedure, adding more data to the forecasting equation.
e. Determine the error statistic or likelihood estimate from accumulation of these error terms.
f. Adjust the parameters of the time series forecasting method, moving the metric toward the optimal.
g. Repeat steps (d) through (f) until the metric is equal to or substantially equal to the optimal.

The description presented also applies in situations where not one (e.g., "n"), but two or more future periods (e.g., "r", "s", "t", etc., where r<s<t<etc.) are chosen in step (15) to optimize the forecasting parameters. When optimizing the forecasting parameters for more than one future period, the optimum for the combination of future periods may not produce an optimum forecast for any one of the individual future periods. Also, the importance of each period relative to the other periods must be determined when the error metric to be optimized (14) is selected or identified. There are numerous criteria for assigning the relative importance for each of the future periods. One way of assigning the importance may be based on relative cost of the component part for each future time period that had to be ordered in advance. Alternatively, a subject assignment can be made for each of the future periods, and even this assignment could change every period that a forecast using this invention was created. For example, supposed period "t" is selected by the user to be the most important, and the importance is set to be equal to 30% of the overall importance. Suppose also that the period "r" is set to be next most important with an importance of 20% of the overall importance. In this manner, step (14) of setting error metrics would continue on until all of the future time periods importance percentages are determined. Of course, the sum of the relative importance percentages should equal 100% for the combined future periods.

Using this alternative approach, the forecasting method of the invention at step (20) calculates the extrapolated forecast for the r-th period, s-th period, t-th period, and so on. The next step (23) determines the amount of error resulting from the forecasting equation for each of the future periods "r", "s", "t", and so on. The relative importance percentages for each of the periods of interest determined in step (14) is multiplied by the individual error terms before accumulating the error in step (24). The forecasting method of this invention would then follow the same steps as the previous approach of optimizing results for a single future time period to optimize the forecasting parameters. The alternative multi-period procedure calculates a weighted average of the error metric. If all of the individual weights are the same, then this procedure simply calculates an average of the error term for specified future periods.

While various embodiments of the present invention have been described in detail, it is apparent that further modifications and adaptations of the invention will occur to those skilled in the art. For example, while many of the examples were specific to product demand and the time period used was months, the present invention may be readily utilized for forecasting any independent variable, such as utility usage in an upcoming time period. Further, the time periods can be any defined period of time such as seconds, minutes, hours, days, weeks, months, years, and the like and any combination thereof. Consequently, it is to be expressly understood that such modifications and adaptations are within the spirit and scope of the present invention, as hereinafter claimed.

What is claimed is:

1. A method of forecasting a value of a dependent variable, such as product demand, in a future time period later than the next, upcoming future time period, comprising:

selecting a dependent variable for which a value is to be forecast;

gathering historical data on values of the dependent variable and explanatory variables in prior time periods;

determining a forecasting equation based on the gathered historical data;

selecting a future time period that is a number of time periods beyond the next, upcoming time period;

with the forecasting equation, calculating a forecasted value of the dependent variable for the selected future time period;

determining an error value by comparing the forecasted value with the historical data; and based on the error value, modifying the forecasting equation to improve the error value.

2. The method of claim 1, wherein the forecast equation determining includes initially setting values for forecast parameters and wherein the modifying of the forecasting equation comprises adjusting the values of the forecast parameters.

3. The method of claim 2, wherein the forecasting equation is a time series forecasting equation and the forecast parameters are time series forecasting parameters.

4. The method of claim 2, further including selecting an error metric for the forecasting equation for optimization and wherein the adjusting of the values of the forecast parameters is performed to move the error metric toward a lower value.

5. The method of claim 4, wherein the error value determining comprises accumulating error values as a function of the error metric.

6. The method of claim 5, wherein the error metric is selected from the group of error metrics consisting of mean absolute deviation (MAD), mean absolute error (MAE), mean absolute percentage error (MAPE), and root mean squared error (RMSE).

7. The method of claim 1, further including prior to the calculating, cleansing the gathered historical data comprising identifying and replacing missing data in the gathered historical data and identifying and modifying outliers in the gathered historical data.

8. The method of claim 1, further including determining whether the error value is optimized and if optimized, skipping the modifying of the forecast equation and ending the method.

9. The method of claim 1, wherein the selecting includes selecting at least a second future time period and assigning an importance value to each of the selected future time periods.

10. The method of claim 9, wherein the calculating and determining of the error value are performed for each of the future time periods, the determining including multiplying the importance values to the error values.

11. A computer program for forecasting embodied in a tangible media, comprising:

first computer code devices configured to cause a computer to request and accept as input a dependent variable to be used in the forecasting;

second computer code devices configured to cause a computer to gather and store in memory historical data for the dependent variable and for explanatory variables;

third computer code devices configured to cause a computer to determine a forecasting equation based on the stored historical data;

fourth computer code devices configured to cause a computer to request and accept as input a future time period for performing the forecasting;

fifth computer code devices configured to cause a computer to calculate with the forecasting equation a forecasted value for the dependent variable in the inputted future time period;

sixth computer code devices configured to cause a computer to determine an error value based on a comparison of the forecasted value and the historical data; and seventh computer code devices configured to compare the error value with an optimal value and based on the comparison modify the forecasting equation to move the error value to be closer in value to the optimal value.

12. The computer program of claim 11, wherein the forecast equation is a time series forecasting equation and the third computer code devices are configured to cause a computer to determine initial values for forecast parameters in the forecast equation automatically or by receiving input.

13. The computer program of claim 12, wherein seventh computer code devices are configured to cause the computer to modify the forecasting equation by modifying the forecasting parameters.

14. A computer-based method for forecasting a value of a dependent variable in a future time period as a function of values of explanatory independent variables, the future time period being a selectable number of time periods beyond a current time period, comprising:

collecting historical data on the values of the dependent variable and the independent variables;

determining a form of a time series forecasting equation using the historical data;

receiving as input the future time period;

initializing forecast parameters of the time series forecasting equation;

selecting an error metric for the time series forecasting equation;

determining a value for the error metric for the future time period including calculating an error term and accumulating the error term as a function of the error metric;

comparing the value of the error metric to an optimal value; and adjusting the forecast parameters based on the comparing to move the value of the error metric toward the optimal value.

15. The method of claim 14, further including receiving from a user as input a dependent variable prior to the collecting.

16. The method of claim 14, further including repeating the calculating, the error metric value determining, the comparing, and the adjusting until the value of the error metric is substantially equal to the optimal value.

* * * * *